US012712476B2

(12) United States Patent
Park

(10) Patent No.: US 12,712,476 B2
(45) Date of Patent: Aug. 18, 2026

(54) METHOD AND APPARATUS FOR CONTROLLING ELECTROMECHANICAL BRAKE

(71) Applicant: HL MANDO CORPORATION, Gyeonggi-do (KR)

(72) Inventor: Jaesang Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 221 days.

(21) Appl. No.: 18/769,812

(22) Filed: Jul. 11, 2024

(65) Prior Publication Data

US 2025/0023495 A1 Jan. 16, 2025

(30) Foreign Application Priority Data

Jul. 12, 2023 (KR) ........................ 10-2023-0090350

(51) Int. Cl.

*H02P 3/22* (2006.01)
*B60T 13/74* (2006.01)
*F16D 65/16* (2006.01)
*H02P 23/14* (2006.01)
*H02P 27/06* (2006.01)
*F16D 121/24* (2012.01)

(52) U.S. Cl.

CPC .............. *H02P 3/22* (2013.01); *B60T 13/746* (2013.01); *F16D 65/16* (2013.01); *H02P 23/14* (2013.01); *H02P 27/06* (2013.01); *F16D 2121/24* (2013.01)

(58) Field of Classification Search

CPC ...... B60T 13/741; B60T 13/746; F16D 65/16; F16D 2121/24; H02P 27/06; H02P 23/14; H02P 3/22

USPC ........................................................ 318/703

See application file for complete search history.

(56) References Cited

U.S. PATENT DOCUMENTS

2006/0061923 A1* 3/2006 Wang ...................... H02P 29/02 361/23
2007/0223262 A1* 9/2007 Stancu ...................... B60L 3/04 363/57
2020/0343834 A1* 10/2020 Jung ...................... H02P 21/18
(Continued)

FOREIGN PATENT DOCUMENTS

KR 10-2004-0046212 6/2004
KR 10-2021-0087205 7/2021

OTHER PUBLICATIONS

Office Action dated Jan. 16, 2026 for Korean Patent Application No. 10-2023-0090350 and its English translation provided by Applicant's foreign counsel.

*Primary Examiner* — Gabriel Agared

(74) *Attorney, Agent, or Firm* — WOMBLE BOND DICKINSON (US) LLP

(57) ABSTRACT

According to the embodiment of the present disclosure, an apparatus of controlling an electromechanical brake may include an inverter configured to supply electric power to an electric motor provided in the electromechanical brake, a gate driver configured to identify an operating state of the inverter, and a controller configured to identify at least one of a rotational speed and a position of the electric motor on the basis of the operating state of the inverter, in which the controller controls switches in the inverter to short a circuit in the inverter on the basis that the rotational speed of the electric motor exceeds an operating speed or the position of the electric motor exceeds a threshold value.

12 Claims, 7 Drawing Sheets

(56) References Cited

U.S. PATENT DOCUMENTS

| | | | | |
|---|---|---|---|---|
| 2021/0146897 | A1* | 5/2021 | Mannherz | B60T 8/36 |
| 2021/0394735 | A1* | 12/2021 | Jang | B60T 1/065 |
| 2022/0194338 | A1* | 6/2022 | Nilsson | B60T 8/885 |
| 2023/0219551 | A1* | 7/2023 | Jung | B60T 17/221<br>701/70 |
| 2023/0365107 | A1* | 11/2023 | Lim | B60T 8/172 |

* cited by examiner

METHOD AND APPARATUS FOR CONTROLLING ELECTROMECHANICAL BRAKE

CROSS-REFERENCE TO RELATED APPLICATIONS

This application claims priority under 35 U.S.C. § 119 to Korean Patent Application No. 10-2023-0075267, filed on Jun. 13, 2023, in the Korean Intellectual Property Office (KIPO), the disclosure of which is incorporated by reference herein in its entirety.

TECHNICAL FIELD

The present disclosure relates to an electromechanical brake, and more particularly, to a method and apparatus for stably controlling an electromechanical brake.

BACKGROUND

An electromechanical brake (EMB) refers to a device that generates a braking force by using an actuator operated by an electric motor, unlike a hydraulic brake in the related art.

The EMB may include a drum type EMB and a caliper type EMB. As illustrated in FIG. 1, the drum type EMB operates an electric motor so that an actuator 110 pushes a brake pad 120 outward, thereby obtaining a braking force from a frictional force between the brake pad 120 and a drum 130 that is connected to a tire and rotates. As illustrated in FIG. 2, the caliper type EMB operates an actuator 230 so that a brake pad 210 comes into close contact with a disc 220 that is connected to a tire and rotates, thereby obtaining a braking force from a frictional force between the disc 220 and the brake pad 210.

The EMB may implement a high response speed, and the EMB may be mounted on wheels of a vehicle and operate independently. Therefore, even when the EMB mounted on any one of the wheels of the vehicle fails, the remaining EMBs may be used to brake the vehicle, such that stable braking performance is improved.

When the EMB obtains the braking force, a force corresponding to the braking force is applied. However, in case that a driver releases a brake pedal or a braking force is repeatedly turned on and off at high speed like an operation of an anti-lock brake system (ABS) or electronic stability control (ESC), the applied force is temporarily lost, and a reaction force is delivered to that extent to all mechanical components including an electric motor in the EMB. In case that the electric motor of the EMB is normally operated and controlled, there occurs no problem because a controller of the EMB controls a restoring force and/or position. However, in case that a disturbance occurs because of a road surface state, a vehicle condition, abrasion, and the like, an impact is delivered to the EMB, which may accelerate adhesion of the mechanical components of the EMB, particularly a speed reducer or abrasion of the vehicle.

The controller of the EMB may generally control a braking force of the EMB by controlling torque, a speed, and/or a position of the electric motor. However, in case that there occurs a situation exceeding control responsiveness, no action is taken until the time corresponding to performance of the controller elapses. Furthermore, in the event of a failure of the EMB, the failure affects the vehicle or braking performance of the other EMBs. Therefore, it is necessary to prevent the failed EMB from causing additional abnormality.

Because the EMB exhibits high responsiveness in comparison with a hydraulic disc brake and thus is highly likely to cause failures or degradation of the mechanical components, it is necessary to improve the durability. For example, in case that a rotational speed of the electric motor is reduced by using a belt-pulley speed reducer, long-term fatigue may shorten a lifespan of the belt and cause a failure such as a belt skip. Therefore, it is necessary to minimize this effect in advance.

SUMMARY

The present disclosure has been made in an effort to provide an apparatus and method capable of controlling an electromechanical brake such that even in the event of a failure of the electromechanical brake, the effect of the failed electromechanical brake on braking performance is minimized.

The present disclosure has also been made in an effort to provide an apparatus and method capable of stably controlling an electromechanical brake even when a situation exceeding control responsiveness of the electromechanical brake.

The present disclosure has also been made in an effort to provide an apparatus and method capable of improving durability of an electromechanical brake.

Technical objects to be achieved by the present disclosure are not limited to those described above, and other technical objects not mentioned above may also be clearly understood from the descriptions given below by those skilled in the art to which the present disclosure belongs.

According to the embodiment of the present disclosure, an apparatus of controlling an electromechanical brake may include: an inverter configured to supply electric power to an electric motor provided in the electromechanical brake; a gate driver configured to identify an operating state of the inverter; and a controller configured to identify at least one of a rotational speed and a position of the electric motor on the basis of the operating state of the inverter, in which the controller controls switches in the inverter to short a circuit in the inverter on the basis that the rotational speed of the electric motor exceeds an operating speed or the position of the electric motor exceeds a threshold value.

In this case, the controller may calculate the rotational speed of the electric motor by using position information acquired by using a position sensor provided at one side of the electric motor on the basis that the operating state of the inverter indicates a normal state, and the controller may perform control to turn on high-side switches or low-side switches and turn off the remaining switches among the switches on the basis that the rotational speed exceeds the operating speed.

The gate driver may identify a position and the type of failure of a failed switch among the switches in the inverter on the basis of a voltage of the inverter and create state information including information on the position and the type of failure of the failed switch.

The controller may compare the threshold value with a position value acquired by using a position sensor provided at one side of the electric motor on the basis that the state information indicates a failed state.

The controller may perform control to turn on the switches disposed at the same side as the failed switch and turn off the remaining switches on the basis that the failed switch is in an on-state and the position value exceeds the threshold value.

The controller may perform control to turn off the switches disposed at the same side as the failed switch and turn on the remaining switches on the basis that the failed switch is in an off-state and the position value exceeds the threshold value.

The controller may control the switches to adjust the position of the electric motor by using speed control information for a vehicle on the basis that the position value is equal to or less than the threshold value.

The controller may control the switches so that the electric motor moves to a position at which a braking force is not generated on the basis that the speed control information indicates acceleration, and the controller may control the switches to short the circuit after the electric motor moves to a position at which the braking force is generated on the basis that braking-related information indicates deceleration.

According to another embodiment of the present disclosure, a method of controlling an electromechanical brake may include: identifying an operating state of an inverter configured to supply electric power to an electric motor provided in the electromechanical brake; identifying at least one of a rotational speed and a position of the electric motor on the basis of the operating state of the inverter; and controlling switches in the inverter to short a circuit in the inverter on the basis that the rotational speed of the electric motor exceeds an operating speed or the position of the electric motor exceeds a threshold value.

According to still another embodiment of the present disclosure, a computer program stored in a computer-readable recording medium may include: an instruction executed by a processor to perform: identifying at least one of a rotational speed and a position of the electric motor on the basis of an operating state of an inverter configured to supply electric power to an electric motor provided in an electromechanical brake; and controlling switches in the inverter to short a circuit in the inverter on the basis that the rotational speed of the electric motor exceeds an operating speed or the position of the electric motor exceeds a threshold value.

According to the embodiment of the present disclosure, the effect of the electronic brake on the braking performance may be minimized even in the event of a failure of the electromechanical brake, thereby ensuring braking stability.

According to the embodiment of the present disclosure, the control may be performed so that unnecessary rotation or vibration does not occur on the electronic brake even when a situation exceeding control responsiveness of the electromechanical brake, thereby minimizing a force to be applied to the mechanical components of the electromechanical brake.

According to the embodiment of the present disclosure, the control may be performed so that an impact to be applied to the mechanical components of the electromechanical brake is minimized, thereby improving the durability of the electromechanical brake.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
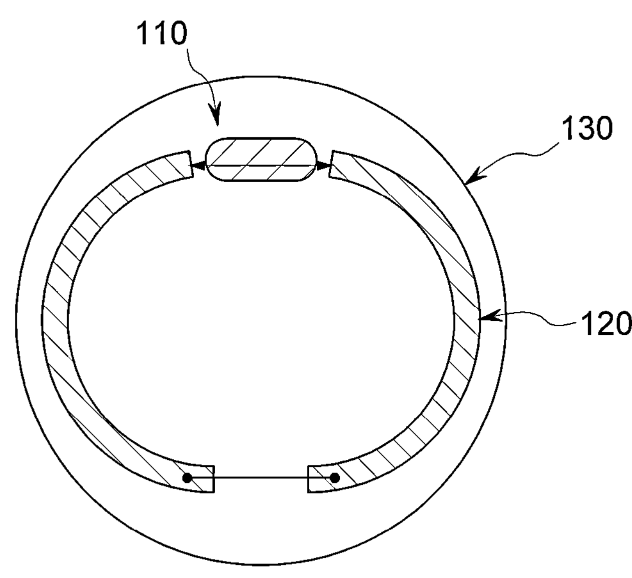
FIG. 1 is a view illustrating a drum type electromechanical brake.
Figure 2:
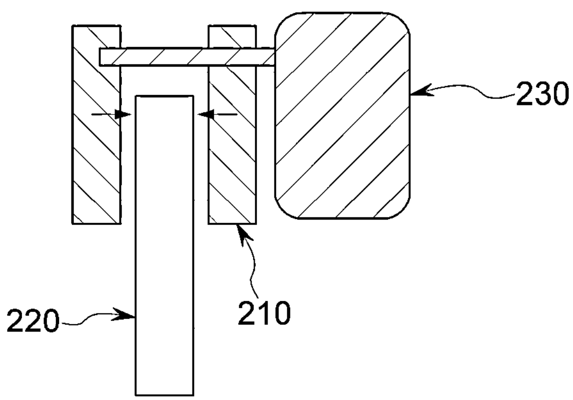
FIG. 2 is a view illustrating a caliper type electromechanical brake.

The advantages and features of the present disclosure, and a method for achieving them will be clearly understood with reference to the embodiments described in detail together with appended drawings. However, the present disclosure is not limited to the embodiments disclosed below but may be implemented in various other forms; rather, the present embodiments are provided to make the present disclosure complete and inform those skilled in the art clearly of the technical scope of the present disclosure, and the present disclosure may be defined within the technical scope of the appended claims. Thus, in some embodiments, well-known processing steps, structures, and techniques have not been described in detail to avoid obscuring the interpretation of the present disclosure.

The terms used in the present disclosure have been selected from commonly used and widely accepted terms that best describe the functions of the present disclosure; however, it should be noted that the selection of terms may vary depending on the intention of those persons skilled in the corresponding field, precedents, or emergence of new technologies. Also, in a particular case, some terms may be selected arbitrarily by the applicant, and in this case, detailed definitions of the terms will be provided in the corresponding description of the present disclosure. Therefore, the terms used in the present disclosure should be defined not simply by their apparent name but based on their meaning and context throughout the present disclosure.

Throughout the document, unless otherwise explicitly stated, if a particular element is said to "include" some particular element, it means that the former may further include other particular elements rather than exclude them.

The term "unit" or "module" used in the present disclosure may refer to a software component or a hardware component such as a Field Programmable Gate Array (FPGA) or an Application Specific Integrated Circuit (ASIC), and the "unit" or "module" performs at least one function or operation. However, the "unit" or "module" is not necessarily limited to a software or hardware component. The "unit" or "module" may be configured to be implemented in an addressable storage medium or configured to operate one or more processors. Therefore, for example, the "unit" or "module" includes those components such as software components, object-oriented software components, class components, and task components; processes, functions, properties, procedures, subroutines, segments of a program code, drivers, firmware, micro-code, circuits, data, databases, data structures, tables, arrays, and variables. The functions provided by the constituting elements and the "unit" or "module" of the present disclosure may be combined into a smaller number of constituting elements, "units", and "modules" or further divided into additional constituting elements, "units", or "modules".

The terms such as first, second, and third are introduced to describe various constituting elements, but the constituting elements should not be limited by the terms. The terms are used only for the purpose of distinguishing one from the other constituting elements.

In what follows, embodiments of the present disclosure will be described in detail with reference to appended drawings so that those skilled in the art to which the present disclosure belongs may readily apply the present disclosure. Moreover, to describe the present disclosure without ambiguity, those parts not related to the description of the present disclosure have been omitted. Throughout the document, the same reference symbols refer to the same constituting elements.

Figure 3:
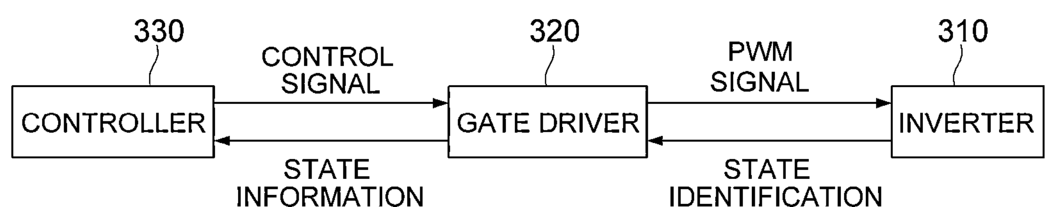
FIG. 3 is a view illustrating an apparatus for controlling an electromechanical brake according to an embodiment of the present disclosure.

FIG. 3 is a view illustrating an apparatus for controlling an electromechanical brake according to an embodiment of the present disclosure.

With reference to FIG. 3, an apparatus for controlling an electromechanical brake (EMB) according to an embodiment of the present disclosure may include an inverter 310, a gate driver 320, and a controller 330.

The inverter 310 may be configured to supply electric power to an electric motor provided in the EMB. For example, the inverter 310 may be configured as a three-phase inverter operated by a three-phase current. In this case, the inverter 310 may include six switches for controlling the three-phase current, and alternating current power outputted from the inverter 310 may be adjusted by switching operations of the switches. A position and/or rotational speed of the electric motor may be adjusted by the three-phase current outputted from the inverter 310, such that an actuator of the EMB connected to the electric motor may be operated. A braking force from the EMB may be generated, increased, or decreased by the operation of the actuator.

The gate driver 320 may identify an operating state of the inverter 310, generate a pulse width modulation (PWM) signal on the basis of a control signal received from the controller 330, and provide or apply the PWM signal to the inverter 310. For example, the gate driver 320 may perform a health check on the basis of a voltage flowing in the inverter 310 and identify a position and/or types of failures of a failed switch among the switches in the inverter 310. The gate driver 320 may create state information including information on whether a failure occurs, a position of the failed switch in the inverter, and the type of failure on the basis of a result of the health check and transfer or provide the state information to the controller 330. In addition, the gate driver 320 may generate a PWM signal by modulating a pulse width of a control signal provided from the controller 330 on the basis of the control information and provide the PWM signal to the inverter 310.

The controller 330 may identify a rotational speed and/or position of the electric motor provided in the EMB on the basis of an operating state of the inverter 310 and control the switches in the inverter 310 so that a circuit of the inverter 310 is shorted when a rotational speed of the electric motor exceeds an operating speed or a position of the electric motor exceeds a threshold value. To this end, the controller 330 may be configured as a micro-controller, for example.

For example, when the result of identifying the state information received from the gate driver 320 indicates that the state information is a normal state, the controller 330 may calculate a rotational speed of the electric motor by using position information acquired by using a position sensor positioned at one side of the electric motor of the EMB. When the rotational speed exceeds the operating speed, the controller 330 may generate a control signal for performing control to turn on high-side switches or low-side switches and turn off the remaining switches among the switches in the inverter 310. In this case, the high-side switches may mean switches disposed at a power source side, and the low-side switches may mean switches disposed at a ground side. In case that the inverter 310 is configured as a three-phase inverter, the controller 330 may generate a control signal on the basis of space vector modulation (SVM).

Meanwhile, when the state information received from the gate driver 320 indicates a failed state, the controller 330 may compare the threshold value with a position value acquired by using the position sensor provided at one side of the electric motor. In this case, the threshold value may be a reference value indicating whether the position of the electric motor is a position for generating the braking force. The braking force may be generated by the EMB in a state in which the position value of the electric motor exceeds the threshold value. The braking force may not be generated by the EMB in a state in which the position value of the electric motor is equal to or less than the threshold value.

When the result of identifying the state information received from the gate driver 320 indicates that the failed switch is in an on-state and the position value acquired by the position sensor exceeds the threshold value, the controller 330 may generate a control signal for performing control to turn on the switches disposed at the same side as the failed switch and turn off the remaining switches. However, when the failed switch is in an off-state and the position value exceeds the threshold value, the controller 330 may generate a control signal for performing control to turn off the switches disposed at the same side as the failed switch and turn on the remaining switches.

When the position value received from the position sensor is equal to or less than the threshold value even in case that the state information received from the gate driver 320 indicates the failed state, the controller 330 may control the switches in the inverter 310 to adjust the position of the electric motor by using speed control information for the vehicle. For example, when the speed control information indicates acceleration, the controller 330 may control the switches in the inverter 310 so that the electric motor moves to a position at which the braking force is not generated. When braking-related information indicates deceleration, the controller 330 may control the switches so that the electric motor moves to the position, at which the braking force is generated, and then the circuit of the inverter 310 is shorted.

Figure 4:
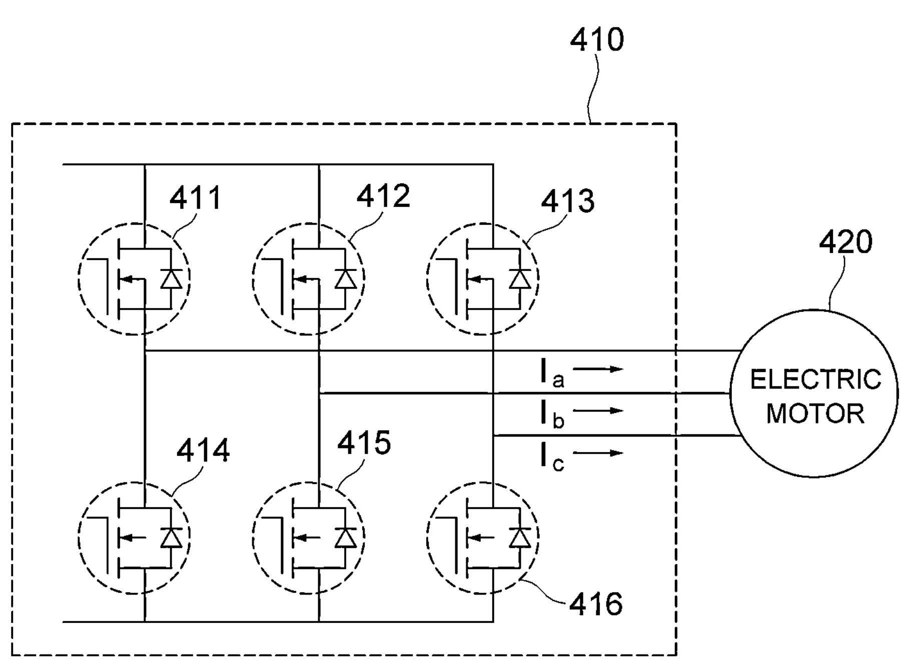
FIG. 4 is a view for explaining a process in which the apparatus for controlling the electromechanical brake according to the embodiment of the present disclosure controls switches in an inverter.

FIG. 4 is a view for explaining a process in which the apparatus for controlling the electromechanical brake according to the embodiment of the present disclosure controls the switches in the inverter.

Hereinafter, a method of shorting, by the apparatus for controlling the EMB, the circuit by controlling the switches in the three-phase inverter will be described in more detail with reference to FIG. 4.

With reference to FIG. 4, a three-phase inverter 410 may include six switches 411 to 416. For example, as illustrated in FIG. 4, the switches may each be configured as a field effect transistor (FET).

Three-phase current ($I_a$, $I_b$, and $I_c$) may be applied to an electric motor 420 provided in the EMB by switching operations of the switches 411 to 416 in the three-phase inverter 410. In this case, an a-phase electric current ($I_a$) may be controlled by on/off operations of the first switch 411 and the fourth switch 414, a b-phase electric current ($I_b$) may be controlled by on/off operations of the second switch 412 and the fifth switch 415, and a c-phase electric current ($I_c$) may be controlled by on/off operations of the third switch 413 and the sixth switch 416. The a-phase electric current ($I_a$) may have a phase difference of 120 degrees from the b-phase electric current ($I_b$) and the c-phase electric current ($I_c$). That is, the current switched by the first switch 411 may have a phase difference of 120 degrees from the currents switched by the second switch 412 and the third switch 413. In addition, the current switched by the first switch 411 may have a phase difference of 180 degrees from the current switched by the fourth switch 414. That is, a phase of the current switched by the first switch 411 may be inverted from a phase of the current switched by the fourth switch 414. Likewise, the currents switched by the second switch 412 and the third switch 413 may have a phase difference of 180 degrees from the currents switched by the fifth switch 415 and the sixth switch 416.

When any one of the six switches 411 to 416 is disconnected (opened) and the position of the disconnected switch, among the three high-side switches 411, 412, and 413 and the three low-side switches 414, 415, and 416 in the inverter 410, is the high side, the apparatus for controlling the EMB may perform control to turn on the three low-side switches 414, 415, and 416 and turn off the high-side switches 411, 412, and 413. On the contrary, when any one of the low-side switches 414, 415, and 416 is disconnected, the controller may perform control to turn on the three high-side switches 411, 412, and 413 and turn off the three low-side switches 414, 415, and 416.

In the case of the short circuit, when any one of the three high-side switches 411, 412, and 413 fails, the controller may perform control to turn on the three high-side switches 411, 412, and 413 and turn off the three low-side switches 414, 415, and 416. On the contrary, when any one of the low-side switches 414, 415, and 416 is shorted, the controller may perform control to turn off the three high-side switches 411, 412, and 413 and turn on the three low-side switches 414, 415, and 416.

For example, when the apparatus for controlling the EMB receives state information indicating a short circuit of the first switch 411 from the gate driver and the position of the electric motor 420 exceeds the threshold value, the apparatus for controlling the EMB may turn on the second switch 412 and the third switch 413 disposed at the same side as the first switch 411 and turn off the fourth switch 414, the fifth switch 415, and the sixth switch 416. That is, the apparatus for controlling the EMB may short the three-phase circuit of the inverter 410 by performing on/off control on the normal switches on the basis of the state of the failed switch. Therefore, it is possible to prevent a situation in which an unnecessary braking force is additionally generated by the electric motor 420.

As another example, when the apparatus for controlling the EMB receives state information indicating a disconnection of the first switch 411 from the gate driver and the position of the electric motor 420 exceeds the threshold value, the apparatus for controlling the EMB may turn off the second switch 412 and the third switch 413 disposed at the same side as the first switch 411 and turn on the fourth switch 414, the fifth switch 415, and the sixth switch 416.

As still another example, when the apparatus for controlling the EMB receives state information indicating a short circuit of the fourth switch 414 from the gate driver and the position of the electric motor 420 exceeds the threshold value, the apparatus for controlling the EMB may turn on the fifth switch 415 and the sixth switch 416 disposed at the same side as the fourth switch 414 and turn off the first switch 411, the second switch 412, and the third switch 413.

As still yet another example, when the apparatus for controlling the EMB receives state information indicating a disconnection of the fourth switch 414 from the gate driver and the position of the electric motor 420 exceeds the threshold value, the apparatus for controlling the EMB may turn off the fifth switch 415 and the sixth switch 416 disposed at the same side as the fourth switch 414 and turn on the first switch 411, the second switch 412, and the third switch 413.

As a further example, the apparatus for controlling the EMB may periodically determine whether the rotational speed of the electric motor 420 exceeds the operating speed when the inverter 410 is in the normal state. When the rotational speed of the electric motor 420 exceeds the operating speed, the apparatus for controlling the EMB may short the three-phase circuit of the inverter 410 by turning on the first switch 411, the second switch 412, and the third switch 413 and turning off the fourth switch 414, the fifth switch 415, and the sixth switch 416. Alternatively, the apparatus for controlling the EMB may short the three-phase circuit of the inverter 410 by turning off the first switch 411, the second switch 412, and the third switch 413 and turning on the fourth switch 414, the fifth switch 415, and the sixth switch 416. When the rotational speed of the electric motor 420 is equal to or lower than the operating speed in case that the inverter 410 is in the normal state, the apparatus for controlling the EMB may not take a separate action until the next determination cycle.

Figure 5:
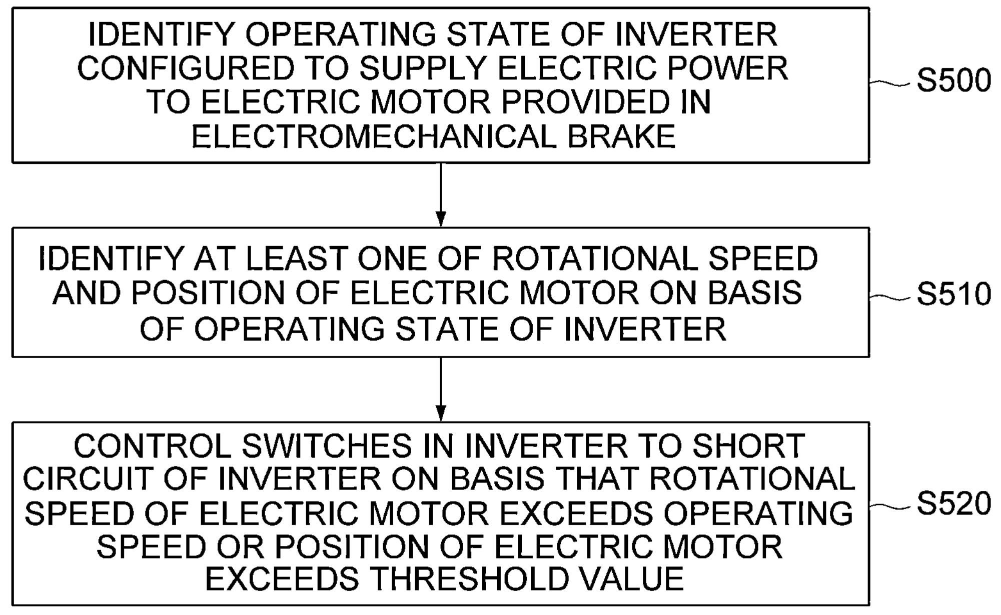
FIG. 5 is a view illustrating a method of controlling the electromechanical brake according to the embodiment of the present disclosure.

FIG. 5 is a view illustrating a method of controlling the electromechanical brake according to the embodiment of the present disclosure.

With reference to FIG. 5, the controller of the apparatus for controlling the EMB may identify the operating state of the inverter configured to supply electric power to the electric motor provided in the EMB (S500). The controller of the apparatus for controlling the EMB may identify the operating state of the inverter on the basis of the state information received from the gate driver. The gate driver may periodically perform the health check on the inverter, identify whether a failure of the switches in the inverter occurs, a position of the failed switch, and the type of failure (e.g., a short circuit in an ON or OFF state), create state information including the information, and provide the state information to the controller.

The controller of the apparatus for controlling the EMB may identify at least one of the rotational speed and the position of the electric motor on the basis of the operating state of the inverter (S510). In this case, the position of the electric motor may be identified on the basis of the position value (or position information) received from the position sensor provided in the electric motor, and the rotational speed of the electric motor may be calculated on the basis of the position value received from the position sensor provided in the electric motor.

The controller of the apparatus for controlling the EMB may control the switches in the inverter to short the circuit of the inverter when the rotational speed of the electric motor exceeds the operating speed or the position of the electric motor exceeds the threshold value (S520). For example, when the controller of the apparatus for controlling the EMB identifies the state information from the gate driver and determines that the inverter operates normally, the controller may compare the rotational speed of the electric motor with the operating speed and determine whether to short circuit the circuit of the inverter on the basis of the comparison result. However, when the result of identifying the state information indicates that the inverter fails, the controller may compare the position of the electric motor with the threshold value and determine whether to short circuit the circuit of the inverter.

Figure 6:
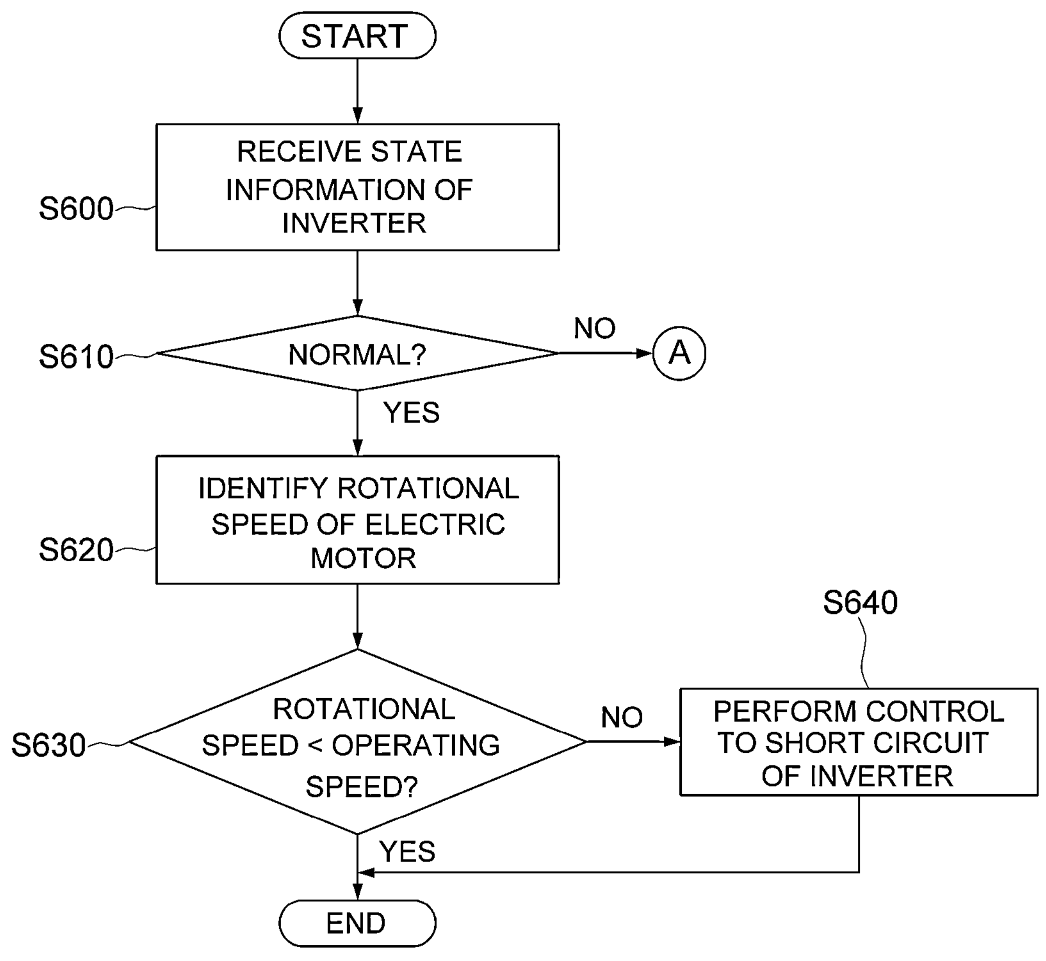
FIG. 6 is a view illustrating a control process of the apparatus for controlling the electromechanical brake according to the embodiment of the present disclosure when the inverter is in a normal state.
Figure 7:
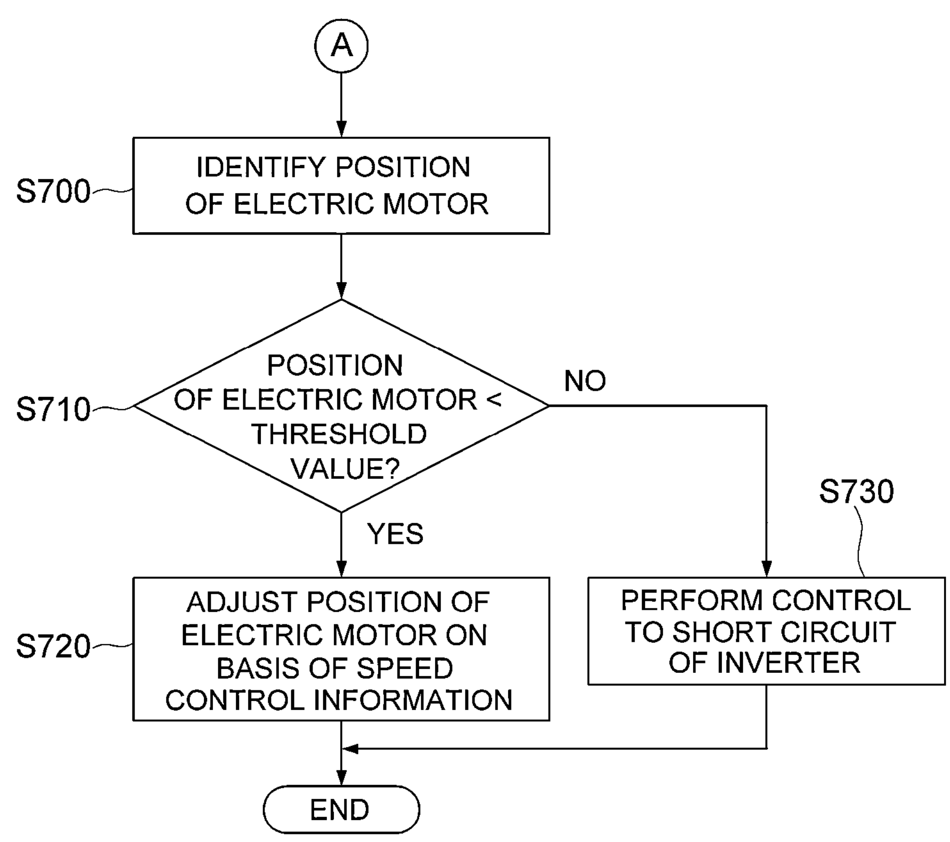
FIG. 7 is a view illustrating a control process of the apparatus for controlling the electromechanical brake according to the embodiment of the present disclosure when the inverter is in a failed state.

FIG. 6 is a view illustrating a control process of the apparatus for controlling the electromechanical brake according to the embodiment of the present disclosure when the inverter is in a normal state, and FIG. 7 is a view illustrating a control process of the apparatus for controlling the electromechanical brake according to the embodiment of the present disclosure when the inverter is in a failed state.

First, with reference to FIG. 6, the controller of the apparatus for controlling the EMB may receive the state information of the inverter from the gate driver (S600). For example, the gate driver may identify the position and the type of failure of the failed switch among the switches in the inverter on the basis of the voltage of the inverter and create state information including the information on the position and the type of failure of the failed switch.

When the result of identify the state information indicates that the operating state of the inverter is normal (S6100), the controller of the apparatus for controlling the EMB may identify or calculate the rotational speed of the electric motor by using the position information acquired by using the position sensor provided at one side of the electric motor of the EMB (S620). When the result of comparing the rotational speed with the operating speed (S630) indicates that the rotational speed exceeds the operating speed, the controller of the apparatus for controlling the EMB may control the switches in the inverter to short the circuit of the inverter (S640). To this end, for example, the controller of the apparatus for controlling the EMB may generate the control signal for performing control to turn on the switches (the high-side switches or the low-side switches) at one side, among the switches in the inverter, and turn off the remaining switches and transmit or provide the control signal to the inverter through the gate driver.

Meanwhile, with reference to FIG. 7, when the result of identifying the state information of the inverter received from the gate driver indicates that the inverter fails, the controller of the apparatus for controlling the EMB may identify the position of the electric motor by using the position sensor provided at one side of the electric motor (S700). When the result of comparing the threshold value with the position value acquired by using the position sensor (S710) indicates that the position value is equal to or less than the threshold value, the controller of the apparatus for controlling the EMB may control the switches to adjust the position of the electric motor by using the speed control information for the vehicle (S720).

For example, when the speed control information indicates acceleration, i.e., an accelerator pedal is operated by a driver, the controller of the apparatus for controlling the EMB may control the switches, which operate normally among the switches in the inverter, so that the electric motor moves to the position at which the braking force is not generated. However, when the braking-related information indicates deceleration, i.e., a brake pedal is operated by a driver, the controller of the apparatus for controlling the EMB may control the switches, which operate normally among the switches in the inverter, so that the electric motor moves to the position, at which the braking force is generated, and then the circuit of the inverter is shorted. These operations may be repeatedly performed a preset number of times. When the position of the electric motor is not changed even though these operations are repeatedly performed a predetermined number of times or more, the controller of the apparatus for controlling the EMB may perform control to short the circuit of the inverter.

Meanwhile, when the result of comparing the threshold value with the position value acquired by using the position sensor (S710) indicates that the position value exceeds the threshold value, the controller of the apparatus for controlling the EMB may perform control to short the circuit of the inverter by turning on the switches disposed at the same side as the failed switch and turning off the remaining switches when the failed switch is the on-state and perform control to short the circuit in the inverter by turning off the switches disposed at the same side as the failed switch and turning on the remaining switches when the failed switch is in the off-state (S730).

Meanwhile, the respective operations included in the method for controlling the EMB, performed by the apparatus according to the above-described embodiment, may be implemented as a computer program including instructions for causing a processor to perform the operations.

Each operation included in the method for controlling the EMB, performed by the apparatus according to the above-described embodiment, may be implemented in a computer readable recording medium having a computer program storing instructions thereon, the instructions for causing a processor to perform the operations.

Combinations of individual steps of the appended flow diagrams of the present disclosure may be performed by computer program instructions. Since these computer program instructions may be provided to a processor of a general-purpose computer, a special-purpose computer, or other programmable data processing apparatus, the instructions executed through the processor of the computer or other programmable data processing apparatus generate means for implementing the functions specified in the individual steps of the flow diagrams. Since these computer program instructions may also be stored in a computer-usable or computer-readable memory that may be directed to a computer or other programmable data processing apparatus to implement a function in a particular manner, the instructions stored in the computer-usable or computer-readable memory may produce a manufacturing item including instructions that execute the functions specified in the individual steps of the flow diagrams. Since the computer program instructions may also be loaded onto a computer or other programmable data processing apparatus, by performing a series of operational steps on the computer or other programmable data processing apparatus to generate a process executed by the computer, the instructions operating the computer or other programmable data processing apparatus may also provide steps for executing the functions specified in the respective steps of the flow diagrams.

Each step may represent part of a module, segment, or code including one or more executable instructions for executing a specific logical function(s). Also, it is also possible that in some alternative embodiments, the specified functions are executed out of specified order. For example, it is possible that two steps shown one after another may be performed simultaneously, or the steps may be performed in reverse order depending on the corresponding functions.

The above description is merely exemplary description of the technical scope of the present disclosure, and it should be understood by those skilled in the art that various changes and modifications may be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims, and it should be appreciated that all technical scopes included within a range equivalent thereto are included in the protection scope of the present disclosure.

DETAILED DESCRIPTION OF MAIN ELEMENTS

310: inverter
320: gate driver
330: controller

What is claimed is:

1. An apparatus of controlling an electromechanical brake, the apparatus comprising:

an inverter configured to supply electric power to an electric motor provided in the electromechanical brake;

a gate driver configured to identify an operating state of the inverter; and a controller configured to identify at least one of a rotational speed and a position of the electric motor on the basis of the operating state of the inverter, wherein the controller controls switches in the inverter to short a circuit in the inverter on the basis that the rotational speed of the electric motor exceeds an operating speed or the position of the electric motor exceeds a threshold value, wherein the gate driver identifies a position and the type of failure of a failed switch among the switches in the inverter on the basis of a voltage of the inverter and creates state information including information on the position and the type of failure of the failed switch, wherein the controller compares the threshold value with a position value acquired by using a position sensor provided at one side of the electric motor on the basis that the state information indicates a failed state, wherein the controller performs control to turn on the switches disposed at the same side as the failed switch and turn off the remaining switches on the basis that the failed switch is in an on-state and the position value exceeds the threshold value, and wherein the controller performs control to turn off the switches disposed at the same side as the failed switch and turn on the remaining switches on the basis that the failed switch is in an off-state and the position value exceeds the threshold value.

2. The apparatus of claim 1, wherein the controller calculates the rotational speed of the electric motor by using position information acquired by using a position sensor provided at one side of the electric motor on the basis that the operating state of the inverter indicates a normal state, and wherein the controller performs control to turn on high-side switches or low-side switches and turn off the remaining switches among the switches on the basis that the rotational speed exceeds the operating speed.

3. The apparatus of claim 1, wherein the controller controls the switches to adjust the position of the electric motor by using speed control information for a vehicle on the basis that the position value is equal to or less than the threshold value.

4. The apparatus of claim 3, wherein the controller controls the switches so that the electric motor moves to a position at which a braking force is not generated on the basis that the speed control information indicates acceleration, and wherein the controller controls the switches to short the circuit after the electric motor moves to a position at which the braking force is generated on the basis that braking-related information indicates deceleration.

5. A method of controlling an electromechanical brake, the method comprising:

identifying an operating state of an inverter configured to supply electric power to an electric motor provided in the electromechanical brake;

identifying at least one of a rotational speed and a position of the electric motor on the basis of the operating state of the inverter; and controlling switches in the inverter to short a circuit in the inverter on the basis that the rotational speed of the electric motor exceeds an operating speed or the position of the electric motor exceeds a threshold value, wherein the identifying of the operating state of the inverter comprises:

identifying a position and the type of failure of a failed switch among the switches in the inverter on the basis of a voltage of the inverter; and creating state information including information on the position and the type of failure of the failed switch, wherein the identifying of the at least one of the rotational speed and the position of the electric motor comprises comparing the threshold value with a position value acquired by using a position sensor provided at one side of the electric motor on the basis that the state information indicates a failed state, and wherein the controlling of the switches comprises:

performing control to turn on the switches disposed at the same side as the failed switch and turn off the remaining switches on the basis that the failed switch is in an on-state and the position value exceeds the threshold value; and performing control to turn off the switches disposed at the same side as the failed switch and turn on the remaining switches on the basis that the failed switch is in an off-state and the position value exceeds the threshold value.

6. The method of claim 5, wherein the controlling of the switches comprises:

calculating the rotational speed of the electric motor by using position information acquired by using a position sensor positioned at one side of the electric motor on the basis that the operating state of the inverter indicates a normal state; and performing control to turn on high-side switches or low-side switches and turn off the remaining switches among the switches on the basis that the rotational speed exceeds the operating speed.

7. The method of claim 5, wherein the controlling of the switches comprises controlling the switches to adjust the position of the electric motor by using speed control information for a vehicle on the basis that the position value is equal to or less than the threshold value.

8. The method of claim 7, wherein the controlling of the switches comprises:

controlling the switches so that the electric motor moves to a position at which a braking force is not generated on the basis that the speed control information indicates acceleration; and controlling the switches to short the circuit after the electric motor moves to a position at which the braking force is generated on the basis that braking-related information indicates deceleration.

9. A computer program stored in a non-transitory computer-readable recording medium, the computer program comprising:

an instruction executed by a processor to perform:

identifying at least one of a rotational speed and a position of the electric motor on the basis of an operating state of an inverter configured to supply electric power to an electric motor provided in an electromechanical brake; and controlling switches in the inverter to short a circuit in the inverter on the basis that the rotational speed of the electric motor exceeds an operating speed or the position of the electric motor exceeds a threshold value, wherein the identifying of the at least one of the rotational speed and the position of the electric motor comprises comparing the threshold value with a position value acquired by using a position sensor provided at one side of the electric motor on the basis that the operating state of the inverter indicates a failed state, and wherein the controlling of the switches comprises:

performing control to turn on the switches disposed at the same side as the failed switch and turn off the remaining switches on the basis that the failed switch among the switches in the inverter is in an on-state and the position value exceeds the threshold value; and performing control to turn off the switches disposed at the same side as the failed switch and turn on the remaining switches on the basis that the failed switch among the switches in the inverter is in an off-state and the position value exceeds the threshold value.

10. The computer program of claim 9, wherein the controlling of the switches comprises:

calculating the rotational speed of the electric motor by using position information acquired by using a position sensor positioned at one side of the electric motor on the basis that the operating state of the inverter indicates a normal state; and performing control to turn on high-side switches or low-side switches and turn off the remaining switches among the switches on the basis that the rotational speed exceeds the operating speed.

11. The computer program of claim 9, wherein the controlling of the switches comprises controlling the switches to adjust the position of the electric motor by using speed control information for a vehicle on the basis that the position value is equal to or less than the threshold value.

12. The computer program of claim 11, wherein the controlling of the switches comprises:

controlling the switches so that the electric motor moves to a position at which a braking force is not generated on the basis that the speed control information indicates acceleration; and controlling the switches to short the circuit after the electric motor moves to a position at which the braking force is generated on the basis that braking-related information indicates deceleration.

* * * * *